(12) United States Patent
Rodriguez

(10) Patent No.: US 6,338,236 B1
(45) Date of Patent: Jan. 15, 2002

(54) MECHANIZED HARVESTING MACHINE WITH ROTATING PICKING ELEMENTS

(76) Inventor: Henry Rodriguez, 7066 N. Rodriguez Rd., McNeal, AZ (US) 85617

( * ) Notice: Subject to any disclaimer, the term of this patent is extended or adjusted under 35 U.S.C. 154(b) by 0 days.

(21) Appl. No.: 09/594,545

(22) Filed: Jun. 14, 2000

(51) Int. Cl.$^7$ ............................................. A01D 45/00
(52) U.S. Cl. ....................................... 56/327.1; 56/13.2
(58) Field of Search ..................... 56/126–130, 327.1, 56/330, 331, 109, 13.2, 128, DIG. 19

(56) References Cited

U.S. PATENT DOCUMENTS

| | | | | |
|---|---|---|---|---|
| 3,613,345 A | * | 10/1971 | Cofer | 56/364 |
| 3,713,283 A | * | 1/1973 | Fritz | 56/364 |
| 4,196,570 A | | 4/1980 | Rodriguez | |
| 4,913,680 A | * | 4/1990 | Desmarais | 460/129 |
| 5,174,093 A | | 12/1992 | Rodriguez | |
| 5,287,687 A | * | 2/1994 | Urich et al. | 56/327.1 |
| 5,987,861 A | * | 11/1999 | Duncan et al. | 56/14.4 |
| 6,003,293 A | * | 12/1999 | Boese | 56/327.1 |
| 6,170,244 B1 | * | 1/2001 | Coers et al. | 56/226 |

* cited by examiner

*Primary Examiner*—Robert E. Pezzuto
*Assistant Examiner*—Arpád Fáb Kovács
(74) *Attorney, Agent, or Firm*—LaValle D. Ptak

(57) ABSTRACT

A harvesting machine particularly suitable for picking or harvesting vegetables, such as peppers or tomatoes, employs a harvesting frame on which is mounted a rotating shaft aligned transversely to the direction of movement of the machine. A pair of spaced apart picking members are mounted on the shaft on opposite sides of a row of plants having a crop to be harvested. The picking members are simultaneously rotated; and each of them has a plurality of arcuate picking elements pivotally mounted on them. The picking elements rotate with the picking members in the same direction of movement of the machine; and as the picking elements rotate downwardly above the row of plants, a cam pivots them into a position adjacent the picking members, spaced away from a plant located between the picking members. As the machine passes over the plant, the picking elements are moved by a second cam into a position to extend into the space between the picking members to engage the plant to be picked and remove crop therefrom for deposition onto a conveyor for removal from the machine.

21 Claims, 6 Drawing Sheets

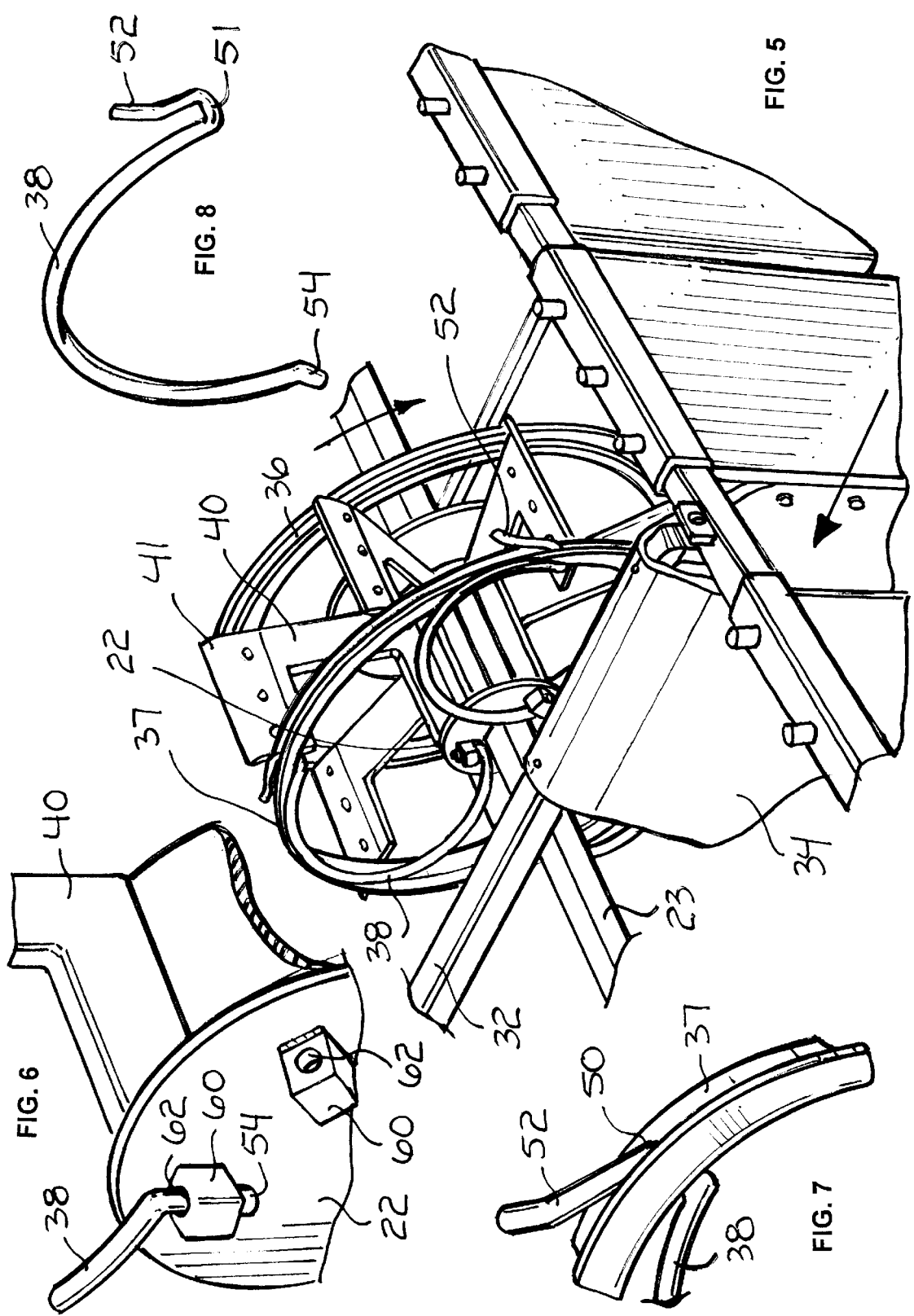

MECHANIZED HARVESTING MACHINE WITH ROTATING PICKING ELEMENTS

BACKGROUND

Mechanized automatic harvesting machines are widely used in large scale farming operations in the grain farming regions of the world, particularly in the United States and Canada. These machines permit a significant reduction in the man hours required to harvest a crop and allow a single farmer to farm large acreages, which was impossible in the labor-intensive farming industry at the turn of the twentieth century in the United States, and even today, in many parts of the world.

Although large scale mechanized farming and harvesting operations are well known in conjunction with grain farming, such mechanized farming has eluded vegetable farmers in most cases. Most vegetables are harvested by hand. This requires a large number of workers per acre of crop to accomplish the harvesting, since the crop generally has only a very short time (a matter of a few days) in most cases, when it is at its peak for harvesting. As labor costs continuously increase, the cost of vegetables produced on such farms continues to rise accordingly.

Some progress has been made to alleviate the high cost of labor in harvesting vegetable crops. This has occurred particularly with respect to the harvesting of peas and beans. For such vegetables, mechanical harvesting machines have been developed which fairly effectively permit the harvesting of a crop. These machines, however, typically gather the plants up and tear them apart to supply the peas or beans to one part of the machine and the remainder of the plant to another part, from which it is discharged as refuse. Such harvesting machines destroy the plants which are bearing the crops to be harvested; so that multiple harvesting of the same plants cannot be effected. In addition, since the machines remove the entire plant during the harvesting operation, separation of the desired parts, the vegetables, from the rest of the plant residue, becomes a significant factor in providing a relatively clean harvest which is not intermixed with undesired plant residue. Special separators and related apparatus is required in order to effect maximum separation of the desired crop from the undesired plant residue.

Although machines of the type described above have been used with some degree of success for picking beans and peas, mechanized picking machines for peppers (such as green and red chiles, bell peppers and the like) and tomatoes, capable of harvesting the crop without damaging it or destroying the plant, or both, have not been developed until the machine disclosed in Rodriguez U.S. Pat. No. 4,196,570. The machine of that patent employs a picking mechanism mounted on a central rotatable shaft, which is located above the row of plants to be picked. The shaft is longitudinally aligned parallel with the row. The shaft has a helical guide attached to it, with the spacing between adjacent turns of the helix selected to be equal to the spacing between each plant in the row of plants to be picked. A number of arcuate picking elements are mounted on the helix; and these picking elements extend between the outer turns of the helix and the shaft to engage the peppers or other vegetables on the plant to pick them as the machine is moved over the row of plants, and as the shaft is rotated. As a consequence, after harvesting, the plant can be used to produce subsequent crops for harvest. This results in substantial savings.

A disadvantage of the machine of the Rodriguez U.S. Pat. No. 4,196,570, however, is that the rotational speed of the helix and the location of each turn of the helix must be carefully synchronized with the movement of the machine and the spacing of the plants. Otherwise, the plants can be torn up or uprooted as the row of plants is harvested. If the helix rotation is out of synchronization with the movement of the machine over the row, or if the plant-to-plant spacing is different from the turn-to-turn spacing of the helix, substantial damage to the plants can occur. Thus, it is necessary in the use of the machine of the Rodriguez U.S. Pat. No. 4,196,570 to exercise extreme skill and care in threading the machine through the row of plants to effect the picking operation.

A later U.S. Pat. No. to Rodriguez, No. 5,174,093, is directed to overcoming the problems noted above for U.S. Pat. No. 4,196,570. In the device disclosed in U.S. Pat. No. 5,174,093, the helical picking element has been replaced with a pair of spaced-apart picking members mounted on a shaft rotated transversely to the row of plants and the direction of movement of the harvesting machine. Two picking members in the form of circular wheels are used; and each of them has a plurality of arcuate picking elements on them. The picking elements extend into the space between the two picking members and operate to strip the crop from the plants while leaving the plants in a relatively undisturbed condition after they have been picked. In order to effect a proper picking operation, however, the picking members, in the form of the rotating wheels, rotate in a direction opposite to the direction of movement of the machine. This causes the picking elements to engage the plants from beneath as the plants first enter the machine. The picking elements then sweep upwardly through the plant to remove the peppers or other crop from the plant. This tends to throw the peppers upwards and outwardly toward the front of the machine; so that special screens and baffles are required to reduce the loss of harvested crop which otherwise may be thrown to the ground and wasted. Even with additional baffles and screens, the machine of this patent, however, still is far more economical than harvesting the crop by hand, since the reduction in harvesting costs far outweighs the value of any crop which is lost.

It is desirable to provide a machine which picks a crop in the manner of the machine of U.S. Pat. No. 5,174,093, but which throws the harvested crop toward the rear of the machine as it moves through a row of plants, and which reduces the losses of crop during the harvesting operation.

SUMMARY OF THE INVENTION

It is an object of this invention to provide an improved mechanized harvesting machine.

It is another object of this invention to provide an improved mechanized harvesting machine which harvests a crop without damaging the plant from which the crop is harvested.

It is an additional object of this invention to provide an improved mechanized pepper harvesting machine.

It is yet another object of this invention to provide an improved mechanized pepper harvesting machine which strips the peppers from a plant and generally throws them toward the rear of the machine as the machine moves forward through a row of plants.

It is a further object of this invention to provide an improved mechanized pepper harvesting machine employing pivotal arcuate picking elements which first are moved out of engagement with a plant beginning passage through the machine, and which then are pivoted to a picking position to strip the peppers upwardly from the plant, as the machine moves over the plant.

In accordance with a preferred embodiment of the invention, a mechanized mobile harvesting machine has a frame on which a rotatable shaft is mounted, substantially parallel to the ground, and transversely to the direction of movement of the machine. First and second spaced-apart picking members, generally in the form of open circular hoops, are mounted on the shaft for rotation by the shaft. Each of these picking members is located in a plane which is perpendicular to the shaft. Each of the picking members has a plurality of arcuate picking elements pivotally mounted on it. A first cam is located to pivot the picking elements to a first position adjacent the picking members at a predetermined rotational position of the picking members. At a different or subsequent rotational position, a second cam then pivots the picking elements to a second position to cause the picking elements to extend a predetermined distance into the space between the first and second picking members for removing crop from plants as the machine moves along a row of plants; and the shaft is rotated to rotate the picking members.

BRIEF DESCRIPTION OF THE DRAWINGS

FIG. 5 is an enlarged partial detail of a portion of the machine shown in FIG. 4;

FIG. 6 is an enlarged detail of another portion of the machine shown in FIG. 5;

FIG. 7 is an enlarged detail of a feature of the preferred embodiment of the invention;

FIG. 8 is a detail of one of the elements of the preferred embodiment of the invention.

DETAILED DESCRIPTION

Figure 1:
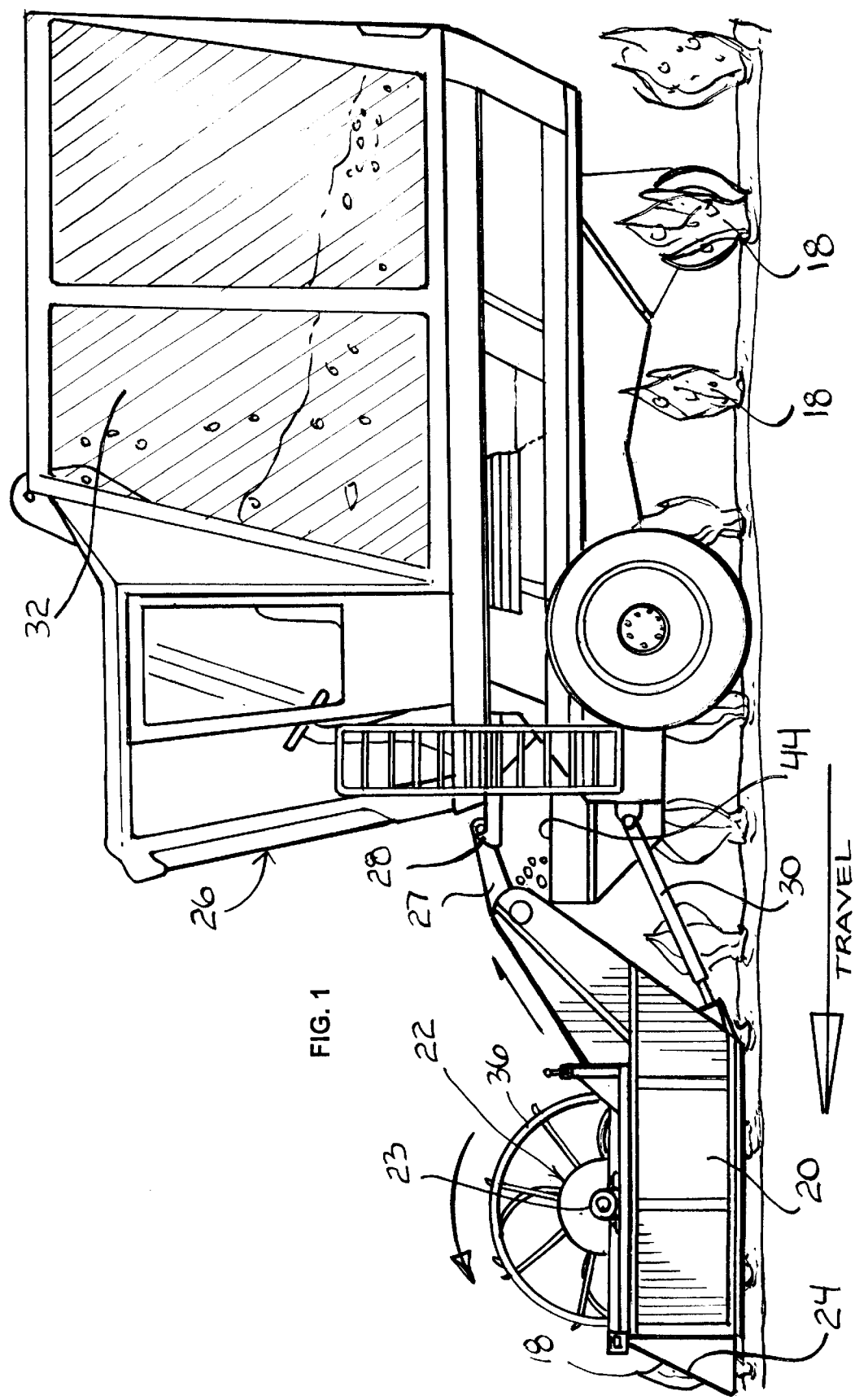
FIG. 1 is a side view of a preferred embodiment of a harvesting machine invention illustrating its manner of support on a tractor.

Reference now should be made to the drawings, in which the same reference numbers are used throughout the different figures to designate the same components. FIG. 1 illustrates a left-hand side view of a mobile mechanized harvesting machine 20 in its mounting position on the front of a suitable tractor 26. The details of the tractor 26 are not important; and as illustrated, the tractor 26 may be of the type commonly used for operating cotton picking machines.

The harvesting machine 20 includes a main frame with a pair of spaced-apart upward extensions at the rear, culminating in an arm having a transverse pin through it. The pin on the arm 27 is seated in a hook extension 28 on the front of the tractor 26 to support the rear of the machine in a generally cantilevered configuration. At the bottom of the frame of the harvesting machine 20, a hydraulic piston 30 interconnects the machine with a point on the tractor 26 located beneath the arm 28. By extending and withdrawing the piston 30, the entire harvesting machine 20 may be pivoted about the pivot at the hook in the end of the support arm 28 on the tractor 26. This raises and lowers the front of the harvesting machine 20 at a pair of extending guide members 24, for each of the rows for which the machine is designed to harvest. Adjustment of the piston 30 adjusts the angle of attack of the machine, and provides for its proper location a short distance above the ground in front of the tractor 26, when the machine is operated.

Figure 4:
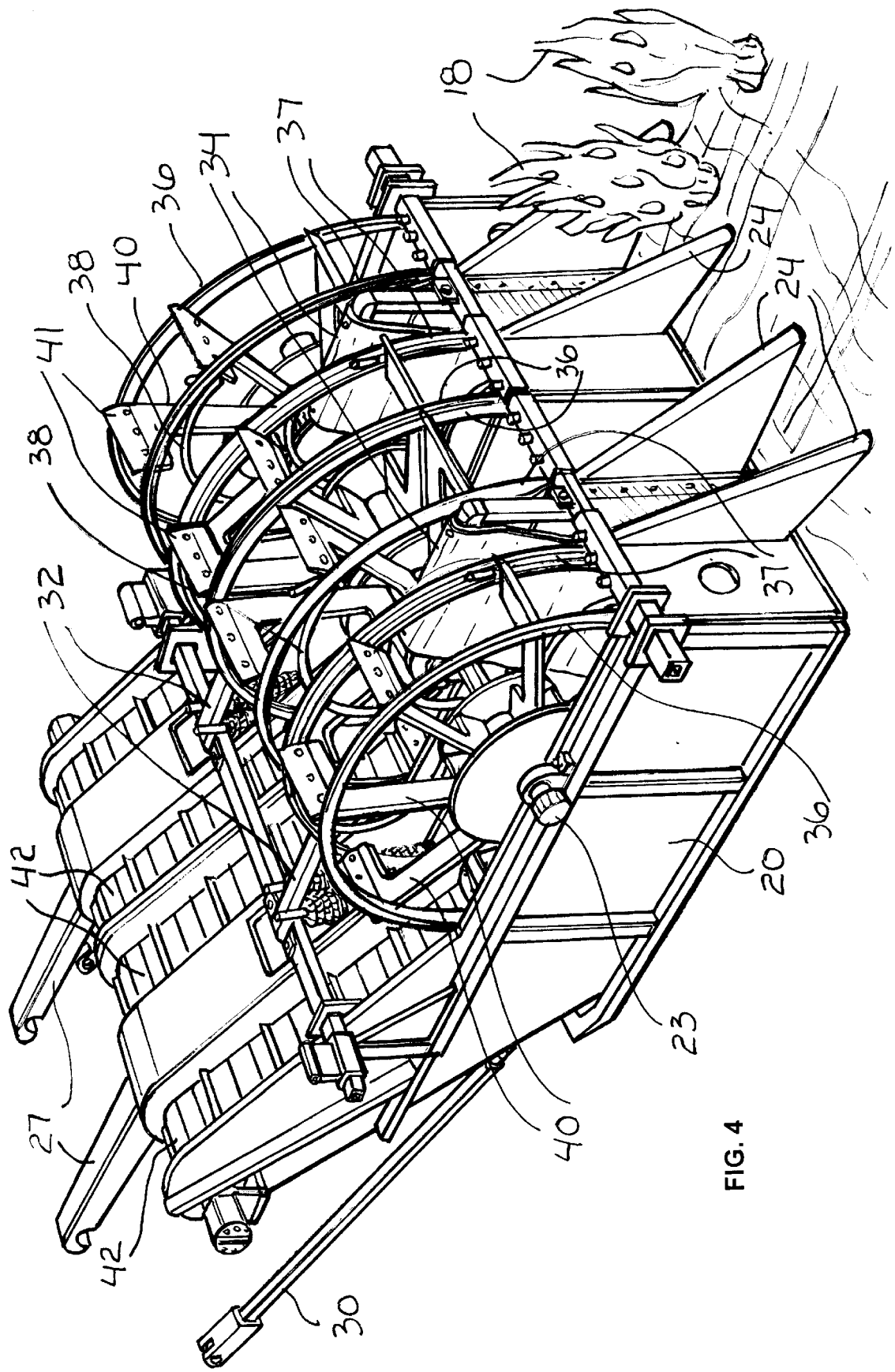
FIG. 4 is a top left front perspective view of the harvesting machine shown in FIG. 1.

The main frame of the machine 20 carries a horizontal transverse rotating shaft 23 extending across the machine from side to side, as most clearly shown in FIG. 4. The shaft 23 ideally is rectangular in its cross-sectional configuration, apart from the ends at the bearings where it is rotated. A set of four circular hub members 22 connected to four wheels 36 are mounted on the shaft. The circular wheels or hoops 36 are located at each of two picking locations on opposite sides of a single row of plants 18 to be harvested. These circular wheels 36 in turn each are connected, by means of L-shaped paddle extensions on the end of radial supports 40 to corresponding circular picking hoops or picking members 37, one for each wheel 36.

The bottoms of the L-shaped support members 40 each terminate in a flexible, rectangular piece of material 41, formed from a rubberized material or a canvas, which is designed as a paddle to sweep between the space between the circumferences of the wheels 36 and members 37 forming each of the four picking member combinations. As is most readily observed in FIG. 5, these flexible paddles 41 extend slightly beyond the circumferences of the set of hoops 36 and members 37 completely across the space between them.

Figure 2:
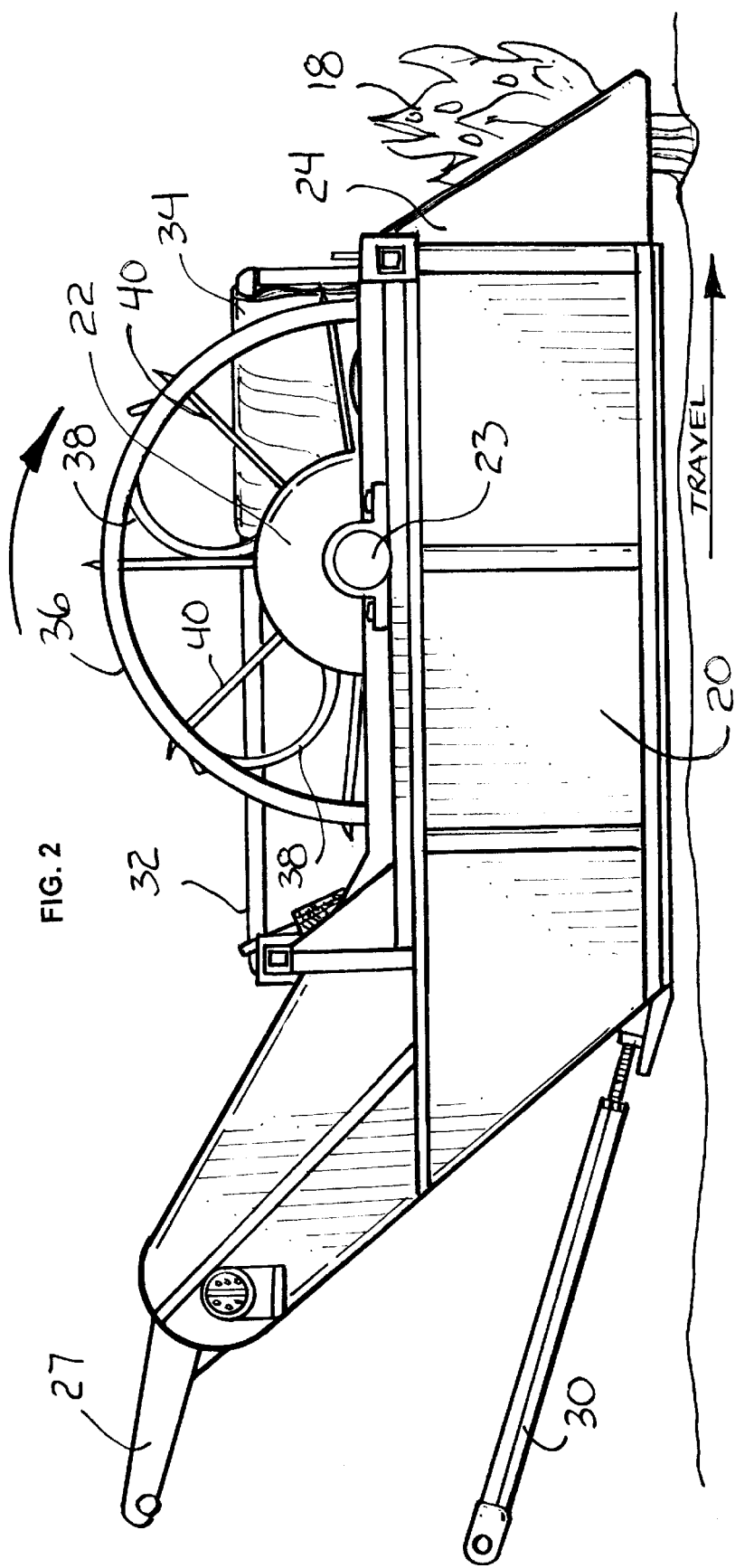
FIG. 2 is an opposite side view of the harvesting machine shown in FIG. 1.

When the machine is moved by the tractor 26 in the direction of travel shown in FIGS. 1 and 2, the machine, as shown in FIG. 4, is designed to pick, simultaneously, two different rows of plants 18. One such row is shown in FIG. 4; but it should be understood that between each pair of guides 24 extending from the front of the machine, a different row of spaced plants 18 passes. The plants pass into an opening in the front of the machine, formed by means of a tent-like covering in the form of a shroud 34, placed over the front part of a front-to-back horizontal bar 32 for each set of two picking members 37 in the machine. As is most apparent from an examination of FIGS. 1, 4 and 5, the shroud 34 extends downwardly from the horizontal support 32 and terminates in a fixed location spaced apart adjacent the edge or outer circumference of the two picking members 37 on opposite sides of each of the rows of plants. The bottom termination of this each 34 is not shown, in order to avoid unnecessary cluttering of the drawings; but it is apparent from an examination, particularly of FIGS. 4 and 5, that when the plant 18 is located within the shroud, it is not engaged by picking elements in any way.

Figure 3:
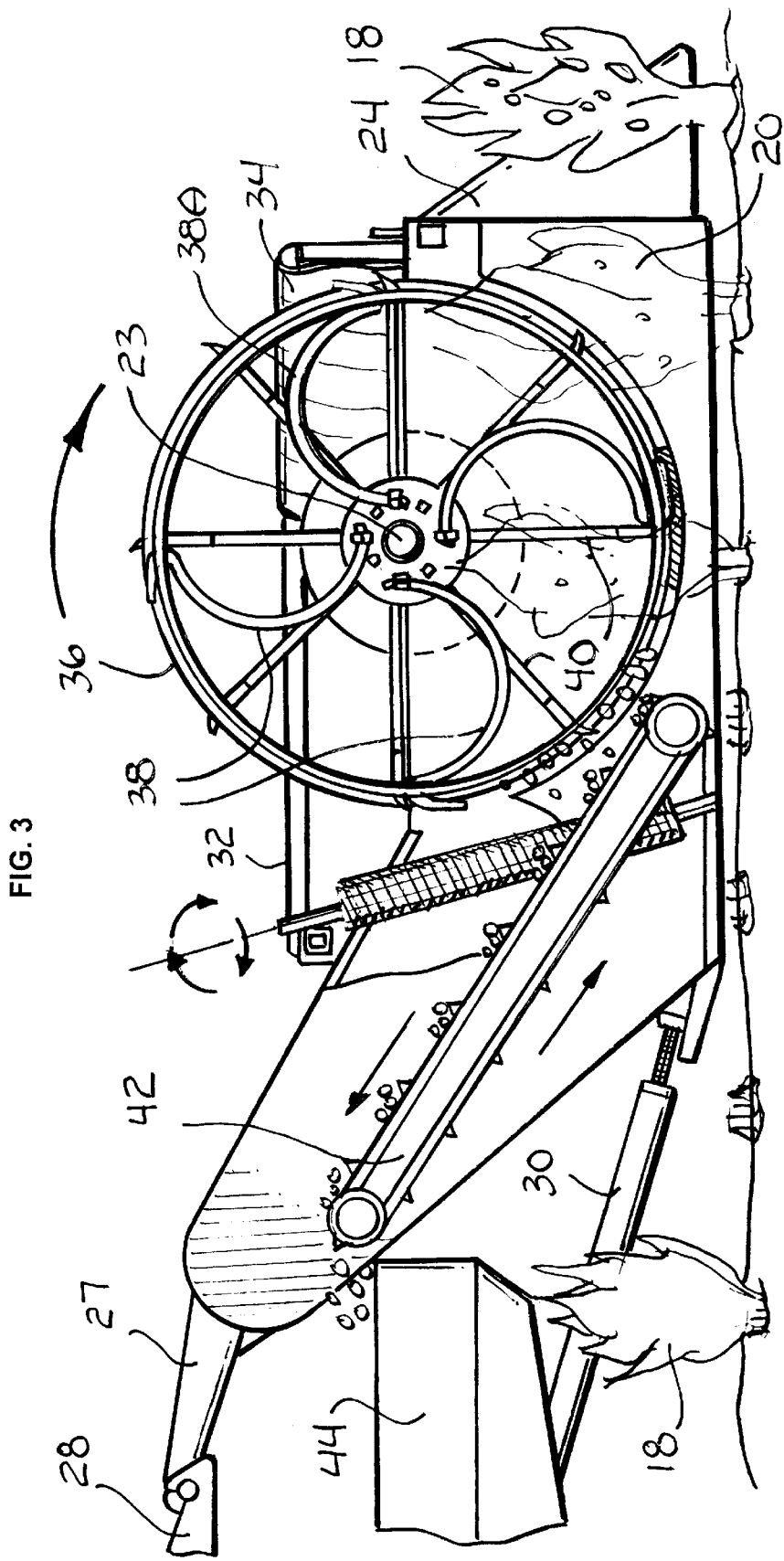
FIG. 3 is a partially cut away view of the harvesting machine shown in FIG. 2.

As the machine moves along, the shaft 23 is rotated by any suitable means (not shown), powered by the tractor 26, or by an independent power plant, to rotate the joined-together wheels 36 and members 37 of all of the four sets which are shown in FIG. 4. This rotation is in the direction shown by the arrows on FIGS. 1, 2 and 3.

In order to effect picking of the crop, such as chiles or the like, and move the crop toward the rear of the machine instead of throwing it toward the front, picking elements 38 are rotated on the picking member wheels 37 in the same direction as the direction of travel of the machine. This means that the arcuate picking elements 38 must rotate downwardly at the front of the machine when the plants 18 are moved into it. That is the reason the shroud 34 is provided. This protects the plant 18 from the picking elements 38. In addition, in order to accomplish this, the picking elements 38 are pivotally mounted on the picking member or wheels 37 for free rotation about their inner ends located on an end plate 22, as illustrated most clearly in FIG. 6. For each of the four picking elements 38 mounted on each of the picking member wheels 37, four blocks 60 are spaced at 90° intervals about the periphery of the plate 22. An end extension 54 on the end of each arcuate picking element 38 is slipped through a hole 62 in each of the blocks 60 to permit the picking element 38 to freely rotate about the extension 54, as shown most clearly in FIGS. 6 and 8.

The picking elements 38 for each row of crop are located in two sets, operated on spaced facing picking member wheels 37, located on opposite sides of the row of plants 18 which passes between them. This orientation is substantially the same as the orientation used in the harvesting machine of U.S. Pat. No. 5,174,093. The picking elements 38, however, are rotated by the ring members 37 from a position above the bar 32; so that as they begin to pass over the top of the shroud 34, the shroud 34 in conjunction with the support provided to it by the horizontal support member 32 acts as a cam to push the picking elements 38 and pivot them about the pivots 54 in the blocks 60 to a position where they are located close to or adjacent the picking member wheels 37 on which they are mounted. Thus, the picking elements 38 pass by on opposite sides of the plant 18, and on opposite sides of the shroud 34. This allows the plant 18 to pass, untouched, beneath the rotating wheel sets 36, 37 (four of which are shown operated in two pairs in the embodiment of FIG. 4).

When the plant 18 reaches the position of the transverse axle 23, the arcuate picking elements 38 pivot to a picking position into the space between the facing picking member wheels 37. To accomplish this, a bend 51 in the end of the element 38 is inserted through a hole 50 in the channel of the picking member wheel 37 (as shown most clearly in FIGS. 7 through 11). An extension 52 on the end of each element 38 is located on the opposite side of the hole 50, and extends from the bend 51 to extend outwardly from the picking member wheel 37 when the picking elements 38 are moved by the cam surface at the top of the shroud 34 to the position described above.

Figures 9, 10, 11:
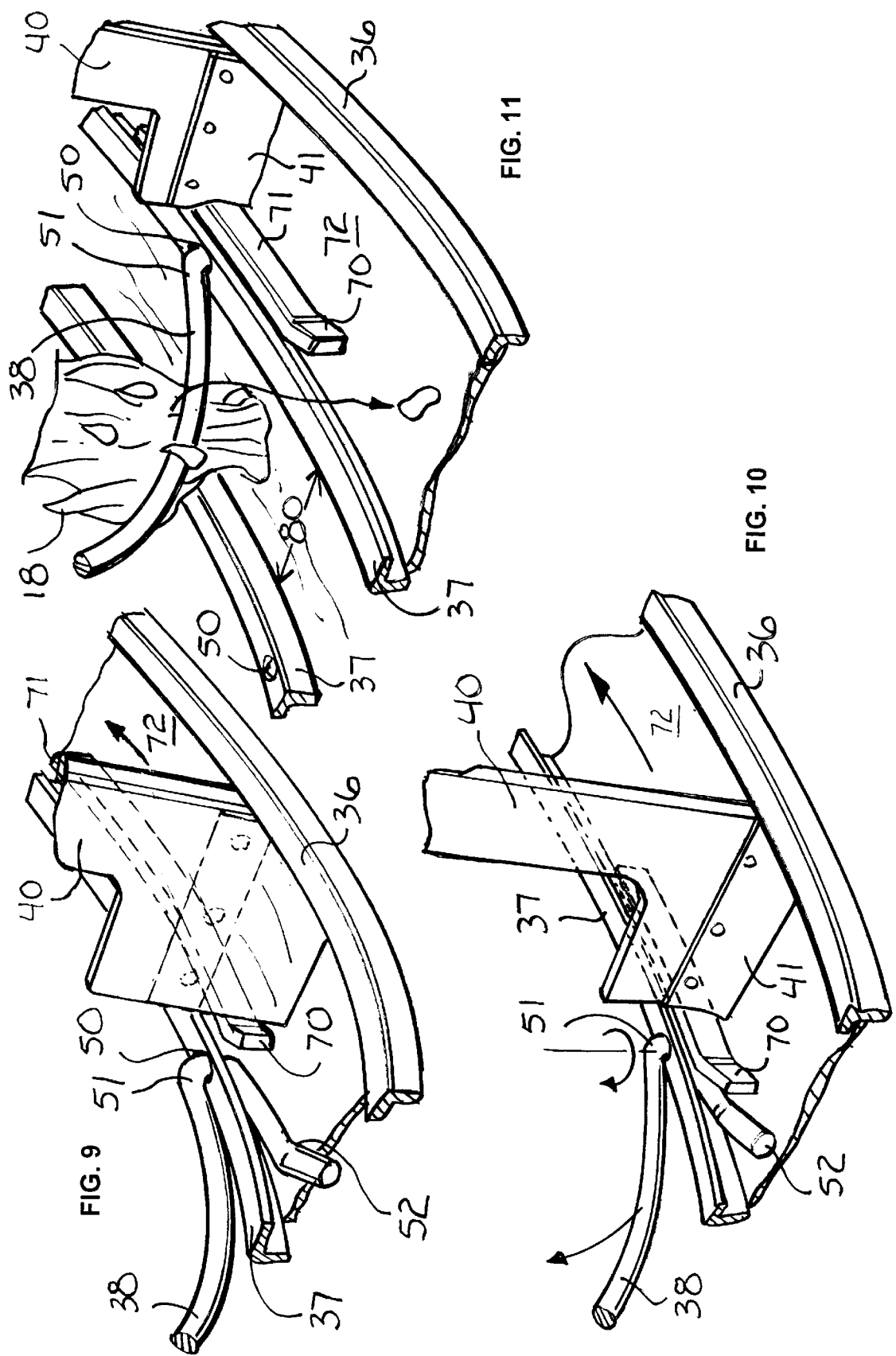
FIGS. 9, 10 and 11 are partially broken-away details of a preferred embodiment of the invention illustrating a step-by-step operating sequence.

As the picking member wheel 37 moves around to the point substantially directly beneath the shaft 23, a cam channel comprised of an extension 70 and an elongated channel 71, fixed to the bottom of the frame of the machine, engages the end 52 of the picking element 38, as illustrated in FIGS. 9, 10 and 11, to rotate the picking element 38 about the bend 51 in the hole 50 to extend the element 38 into the space between adjacent picking member wheels 37 (as illustrated most clearly in FIG. 11). This causes the picking element 38 to sweep upwardly over the plant 18, as shown in FIG. 11, to remove crop from the plant in substantially the same manner as described in U.S. Pat. No. 5,174,093, which is incorporated herein by reference.

It should be noted that picking elements 38 on the facing pairs of picking member wheels 37 are each spaced at 90° intervals on each of the picking wheels 97, but that the opposing picking member wheels 37 have the picking elements 38 offset from one another by 45°; so that the plant first is swept upwardly by the picking element 38 on one picking member 37, and then by the picking element 38 on the picking member 37 on the opposite side, to remove crop from the plant 18.

The rotational speed of the picking member wheels 37 is selected in conjunction with the forward speed of the machine 20 as it is moved over the ground; so that one or two complete revolutions of the picking member wheel sets 37 occur for each plant 18 to thoroughly strip the crop from the plant as the machine moves down the row. This generally amounts to approximately 30 or 40 revolutions per minute of the shaft 23. This speed of operation can be adjusted in accordance with the particular parameters of the crop which is being harvested.

Once the picking member wheels 37 are rotated a sufficient distance to effect a sweeping of the plant by the picking elements 38, the guide channel 71 terminates to again allow free pivoting of the picking elements 38. Thus, as the elements 38 move upwardly and over the top portion of the machine to once again move downwardly, they are free to rotate when the picking elements 38 once again strike the cam shroud 34 to resume a new cycle of operation.

To recover the crop which is removed by the arcuate picking elements 38, the paddles 41 are located in the space between the wheels 36 and the picking member wheels 37 at the guide channel 71. The bottom 72 of the machine in this area, on which the guide channel 71 is mounted, is solid; and the wheel sets 36/37 rotate adjacent this solid bottom or curved base 72. The flexible paddles 41 sweep across this location; and crop which is stripped off of the plants 18 falls onto the surface 72 and is pushed by the rotating paddles 71, which then sweep the crop onto a conveyor 42, shown in FIG. 3. Four conveyors 42 are used, as shown most clearly in FIG. 4, one located adjacent each of the picking wheel members 37. Thus, a pair of conveyors 42, along with the associated pairs of paddle wheel crop removing devices 36, 37, 40 and 41, remove the crop falling on either side of each row of plants.

In the space 80 (FIG. 11) between each pair of picking wheel members 37 used in the machine shown in the drawings, there typically is provided a flexible slotted plastic sheet (not shown); so that the stems of the plants 18 extend upwardly through the slot, which underlies the rest of the plant. This plastic slotted extension may be of any suitable type; and it is used to catch any crop which is not thrown into the area swept by the paddles 41. Not very much crop should fall into this area, since the arcuate picking elements 38 tend to throw the crop off to the side, as indicated in FIG. 11.

Once the crop is moved by the conveyor 42 toward the rear of the machine, it then may be dumped into a transverse conveyor (not shown) for deposition on either side of the machine. As is illustrated in FIG. 1, however, the crop also may be moved from the end of the conveyor 42 into a bin 44, and from there, by means of any suitable conveyor or elevator into a storage bin 32 at the back of the tractor 26. The manner in which the crop is removed from the harvesting machine at the end of the conveyor 42, however, is not important; and any suitable combination of conveyors or other mechanisms may be employed to remove the crop from the machine as the harvesting is effected.

The foregoing description of the preferred embodiment of the invention is to be considered as illustrative and not as limiting. Various other changes and modifications will occur to those skilled in the art for performing substantially the same function, in substantially the same way, to achieve substantially the same result, without departing from the true scope of the invention as defined in the appended claims.

What is claimed is:

1. A mechanized mobile harvesting machine including in combination:

a frame with a rotatable shaft thereon, the shaft mounted substantially parallel to the ground over which the frame is moved, and the shaft placed transversely of the direction of movement of the machine frame;

first and second spaced apart circular picking members each having a radius and mounted for simultaneous rotation on the shaft, each of the first and second picking members located in planes substantially perpendicular to the shaft;

a plurality of arcuate picking elements pivotally mounted on the first and second picking members, the picking elements on the first and second picking members being radially offset from one another, each of the picking elements comprising a rod member with an overall length which is greater than the radius of the picking members;

a first cam member on the frame in a first location for engaging a portion of the arcuate picking elements as the picking members rotate to pivot the picking elements to a first position adjacent the respective first and second picking members; and a second cam member on the frame in a second location adjacent each of the first and second picking members for engaging a portion of the arcuate picking elements on each of the first and second picking members to pivot the arcuate picking elements to a second position where each of the each of the picking elements extends into the space between the first and second picking members.

2. The machine according to claim 1 wherein the plurality of arcuate picking elements on each of the first and second picking members comprises at least four picking elements, each spaced 90° from one another on each of the picking members with the elements on the first picking member being offset from the elements on the second picking member by 45°.

3. The machine according to claim 2 wherein the arcuate picking elements on each of the first and second picking members each extend substantially half-way into the space between the first and second picking members when the arcuate picking elements are pivoted to the second position thereof by the second cam member so that plants to be harvested by the machine are pushed and pulled from one side to the other as the shaft rotates transversely over a row of plants.

4. The machine according to claim 3 wherein the shaft is rotated in a direction to cause the rotation of the picking elements to move the picking elements downwardly in the first position toward the ground, and then to move upwardly after pivoting to the second position by the second cam member as the machine moves along a row of plants.

5. The machine according to claim 4 wherein the first cam member includes a shroud extending between the first and second picking members substantially horizontally from the shaft to an outer circumference of the picking members at the front of the machine as it moves along a row of plants.

6. The machine according to claim 5 wherein the shaft on which the picking members are mounted rotates in a forward direction as the machine moves along a row of plants, and wherein the first cam member engages a portion of the arcuate picking elements as they move downwardly from an uppermost position toward the ground, and wherein the second cam member engages a portion of the arcuate picking elements to rotate them to the second position at a point near the ground as the picking member rotates during the operation of the machine.

7. The machine according to claim 6 further including a crop removal member adjacent each of the picking members for removing crops harvested by the picking members as the machine is moved along a row of plants.

8. The machine according to claim 7 wherein the crop removal member includes, at least in part, paddle members coupled with and rotated with the picking members and located adjacent each of the picking members.

9. The machine according to claim 8 further including an endless belt conveyor adjacent the rotatable paddle members for receiving crop moved by the paddle members and removing crop to a position located a distance from the picking members.

10. The machine according to claim 1 further including a crop removal member adjacent each of the picking members for removing crops harvested by the picking members as the machine is moved along a row of plants.

11. The machine according to claim 10 wherein the crop removal member includes paddle members coupled with and rotated with the picking members and located adjacent each of the picking members.

12. The machine according to claim 11 further including an endless belt conveyor adjacent the rotatable paddle members for receiving crop moved by the paddle members and removing crop to a position located a distance from the picking members.

13. The machine according to claim 1 wherein the plurality of arcuate picking elements on each of the first and second picking members comprises at least four picking elements, each spaced 90° from one another on each of the picking members with the elements on the first picking member being offset from the elements on the second picking member by 45°.

14. The machine according to claim 13 wherein the arcuate picking elements on each of the first and second picking members each extend substantially half-way into the space between the first and second picking members when the arcuate picking elements are pivoted to the second position thereof by the second cam member so that plants to be harvested by the machine are pushed and pulled from one side to the other as the shaft rotates transversely over a row of plants.

15. The machine according to claim 1 wherein the shaft is rotated in a direction to cause the rotation of the picking elements to move the picking elements downwardly in the first position toward the ground, and then to move upwardly after pivoting to the second position by the second cam member as the machine moves along a row of plants.

16. The machine according to claim 1 wherein the first cam member includes a shroud extending between the first and second picking members substantially horizontally from the shaft to an outer circumference of the picking members at the front of the machine as it moves along a row of plants.

17. The machine according to claim 1 wherein the shaft on which the picking members are mounted rotates in a forward direction as the machine moves along a row of plants, and wherein the first cam member engages a portion of the arcuate picking elements as they move downwardly from an uppermost position toward the ground, and wherein the second cam member engages a portion of the arcuate picking elements to rotate them to the second position at a point near the ground as the picking member rotates during the operation of the machine.

18. A mechanized mobile harvesting machine including in combination:

a frame with a rotatable shaft thereon, the shaft mounted substantially parallel to the ground over which the frame is moved, and the shaft placed transversely of the direction of movement of the machine frame;

first and second spaced apart picking members mounted for simultaneous rotation on the shaft, each of the first and second picking members located in planes substantially perpendicular to the shaft;

a plurality of arcuate picking elements pivotally mounted on the first and second picking members, the picking elements on the first and second picking members being radially offset from one another;

a first cam member on the frame in a first location for engaging a portion of the arcuate picking elements as the picking members rotate to pivot the picking elements to a first position adjacent the respective first and second picking members; and a second cam member on the frame in a second location adjacent each of the first and second picking members for engaging a portion of the arcuate picking elements on each of the first and second picking members to pivot the arcuate picking elements to a second position where the arcuate picking elements on each of the first and second picking members each extend substantially half-way into the space between the first and second picking members when the arcuate picking elements are pivoted to the second position thereof by the second cam member so that plants to be harvested by the machine are pushed and pulled as the shaft rotates transversely over a row of plants.

19. The machine according to claim 18 wherein the shaft is rotated in a direction to cause the rotation of the picking elements to move the picking elements downwardly in the first position toward the ground, and then to move upwardly after pivoting to the second position by the second cam member as the machine moves along a row of plants.

20. The machine according to claim 19 wherein the first cam member includes a shroud extending between the first and second picking members substantially horizontally from the shaft to an outer circumference of the picking members at the front of the machine as it moves along a row of plants.

21. The machine according to claim 20 wherein the shaft on which the picking members are mounted rotates in a forward direction as the machine moves along a row of plants, and wherein the first cam member engages a portion of the arcuate picking elements as they move downwardly from an uppermost position toward the ground, and wherein the second cam member engages a portion of the arcuate picking elements to rotate them to the second position at a point near the ground as the picking member rotates during the operation of the machine.

* * * * *